United States Patent [19]
Nakamura

[11] Patent Number: 6,053,045
[45] Date of Patent: Apr. 25, 2000

[54] IMPACT SENSOR

[75] Inventor: Takeshi Nakamura, Uji, Japan

[73] Assignee: Murata Manufacturing Co., Ltd., Japan

[21] Appl. No.: 08/929,735

[22] Filed: Sep. 15, 1997

Related U.S. Application Data

[63] Continuation of application No. 08/680,641, Jul. 17, 1996, abandoned.

[30] Foreign Application Priority Data

Jul. 17, 1995 [JP] Japan .................................. 7-203813

[51] Int. Cl.[7] ...................................................... G01P 15/08
[52] U.S. Cl. ...................................... 73/514.34; 73/514.31; 73/514.33; 310/329; 280/735
[58] Field of Search ............................. 73/514.16, 514.29, 73/514.31, 514.32, 514.33, 514.34, 514.38; 310/329; 280/735

[56] References Cited

U.S. PATENT DOCUMENTS

| | | | |
|---|---|---|---|
| 3,713,343 | 1/1973 | Segerdahl et al. | 73/514.33 |
| 4,315,433 | 2/1982 | Edelman et al. | 73/514.34 |
| 4,809,552 | 3/1989 | Johnson | 73/514.33 |
| 4,972,713 | 11/1990 | Iwata | 73/514.34 |
| 5,118,981 | 6/1992 | Kobayashi et al. | 310/329 |

FOREIGN PATENT DOCUMENTS

| | | | |
|---|---|---|---|
| 0631142 | 12/1994 | European Pat. Off. | |
| 2689642 | 10/1993 | France . | |
| 3703630 | 8/1988 | Germany | 73/514.38 |
| 3930314 | 3/1990 | Germany . | |
| 9210729 | 6/1992 | WIPO . | |
| 9212543 | 7/1992 | WIPO . | |

OTHER PUBLICATIONS

Patent Absracts of Japan, vol. 014, No. 547 (P–1138), Dec. 5, 1990 & JP 2 34065 A (Mitsubishi Electric Corp.), Sep. 17, 1990, Abstract.

*Primary Examiner*—John E. Chapman
*Attorney, Agent, or Firm*—Ostrolenk, Faber, Gerb & Soffen, LLP

[57] ABSTRACT

A nondirectional impact sensor capable of detecting impacts in any direction with only a single sensor. The impact sensor includes a board, a sensor for detecting deformation of the board, a mass and a connector. The connector is secured to a central portion of the board and the mass is disposed on a normal line which traverses the central portion of the board.

14 Claims, 5 Drawing Sheets

IMPACT SENSOR

This is a Continuation of Application Ser. No. 08/680,641 filed on Jul. 17, 1996, abandoned.

BACKGROUND OF THE INVENTION

1. Field of the Invention

The present invention relates to an impact sensor and, more particularly, to an impact sensor for detecting, when, for example, a car accident occurs.

2. Description of the Related Art

Acceleration sensors of various types have been used as impact sensors. Such acceleration sensors have been used, for example, to detect an impact applied to a car when the car is involved in an accident. This is done, for example, to unlock the doors of the car making it easier to save persons trapped in the car.

However, conventional acceleration sensors can detect an impact in only one direction (plane). For this reason, if impacts in all directions are to be detected, acceleration sensors must be disposed in three axial directions intersecting at right angles to each other. When three acceleration sensors are used, the size of the impact sensor is increased as are the manufacturing costs. Additionally, there is a directional aspect in mounting the impact sensor.

SUMMARY OF THE INVENTION

Accordingly, a primary object of the present invention is to provide a nondirectional impact sensor which, with only a single sensor, is capable of detecting impacts in any direction.

In accordance with the present invention, the impact sensor comprises:

a board;

a mass connected to a central portion of said board by a flexible connector such that said board is deformed when an impact is applied to said mass in substantially any direction; and a detector for detecting the deformation of said board.

The connector is preferably a flexible linear material. Alternatively, a rigid bar-shaped material may also be used. In this case, it is preferable that the bar-shaped material be made elastic.

The detector may be a piezoelectric element, or any other suitable detector element such as one using a ferroelectric thin film, a resistance thin film, or a magnetic thin film. In a preferred embodiment, the board itself is formed of a piezoelectric member, and electrodes for detecting a charge generated on the board are formed on the opposed main surfaces of the board to define the detector element.

The shape of the board is preferably rotationally symmetrical in shape. The most desirable shape is circular.

When an impact is applied to the mass, regardless of the direction of the impact, a force is applied to the central portion of the board via the connector. The board is deformed by this force, and a signal is output from the detector according to the deformation of the board. When a piezoelectric element is used as the detector, a charge is generated in the piezoelectric element which is proportional to the deformation of the board. By measuring the voltage generated in the piezoelectric element, it is possible to detect the occurrence of an impact.

If the piezoelectric element is excited beforehand, its resonance frequency and impedance vary according to the deformation of the board. Therefore, the measurement of the resonance frequency and impedance makes it possible to detect the occurrence of an impact.

When a detector element which uses a ferroelectric thin film is used as the detector, its electrostatic capacity varies due to the deformation of the board. By measuring the electrostatic capacity of the detection element, the occurrence of an impact can be detected.

In a similar manner, when a detection element using a resistance thin film is used, the occurrence of an impact can be detected by measuring the variation in the resistance of the detection element. When a detection element using a magnetic thin film is used, the occurrence of an impact can be detected by measuring the variation in the magnetic inductance of the detection element.

Displacement of the mass with respect to the impact in a direction parallel to the connector means can be transmitted to the board by coupling the board and the mass through a string made of flexible linear material. As a result, the degree of freedom of movement the mass becomes substantially the same with respect to impacts in any direction. Therefore, it is possible to make the sensitivity of the impact sensor substantially equal with respect to impacts in any direction.

A rigid bar-shaped material may also be used as the connector. In this case, the intermediate portion of the bar-shaped material is preferably formed into a coil shape, so that the bar-shaped material is made to have an elastic characteristic. The board is preferably formed in a rotationally symmetrical shape, and the board is preferably supported at locations which are equi-distant from the central portion of the board. When this is done, the deformation of the board is maximized when a force is applied to the central portion of the board. A circular plate shaped board is preferred for this purpose.

According to the present invention, a nondirectional impact sensor is obtained which is capable of detecting impacts in any direction. Furthermore, by forming the board to be a rotationally symmetrical shape and using a flexible connector, it is possible to obtain an impact sensor having excellent sensitivity which is substantially the same with respect to impacts in any direction.

The above and further objects, features, and advantages of the invention will become more apparent from the following detailed description of an embodiment made with reference to the accompanying drawings.

BRIEF DESCRIPTION OF THE DRAWINGS

For the purpose of illustrating the invention, there is shown in the drawing several forms which are presently preferred, it being understood, however, that the invention is not limited to the precise arrangements and instrumentalities shown.

DETAILED DESCRIPTION OF A PREFERRED EMBODIMENT

Figure 1:
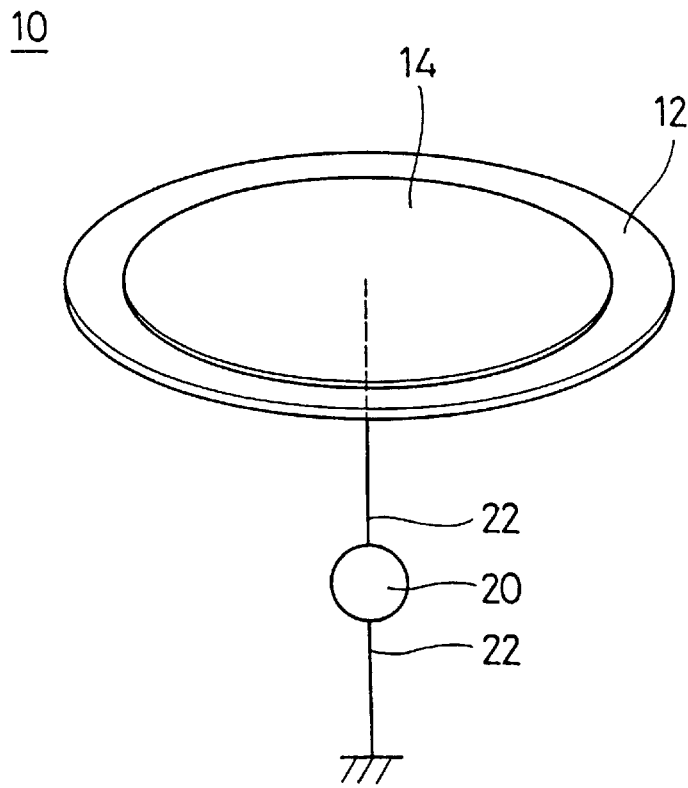
FIG. 1 is a perspective view illustrating an example of an impact sensor constructed in accordance with the principles of the present invention.
Figure 2:
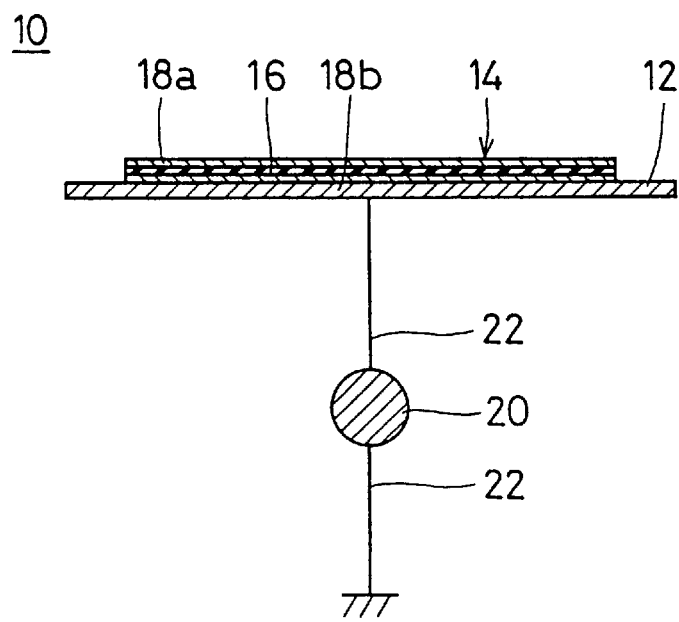
FIG. 2 is a sectional view of the impact sensor shown in FIG. 1.

Referring now to the drawings wherein like numerals indicate like elements, there is shown in FIGS. 1 and 2 an impact sensor constructed in accordance with the principles of the present invention and designed generally as 10. Impact sensor 10 includes a board 12 which, by way of example, is circular in shape. The board 12 may be formed of, for example, a thin metallic plate. A piezoelectric element 14 is located on one side of the board 12 and acts as a detector for detecting when the board 12 bends. The piezoelectric element 14 includes a circular piezoelectric layer 16 (FIG. 2) having electrodes 18a and 18b formed on opposite sides of the piezoelectric layer 16. By way of example, the piezoelectric layer 16, may be formed of a piezoelectric ceramic. The electrode 18b is preferably bonded to the board 12. In this embodiment of the present invention, the diameter of the piezoelectric element 14 is smaller than the diameter of the board 12.

A mass 20 is disposed on the opposite main side of the board 12 and is connected to the board 12 by means of a connection string 22. The connection string 22 is formed of, for example, a string of a metal, nylon, teflon or the like. One end of the mass 20 is connected to the central portion of the board 12 by means of the connection string 22, and the other end of the mass 20 is secured to a case or other support structure by means of the connection string 22. As a result, the connection string 22 is attached in such a manner as to extend in a direction intersecting at right angles to the plane of the board 12, and an imaginary line passing through the center of gravity of the mass 22 in a direction perpendicular to the plane of board 12 passes through the central portion of board 12. The connection string 22 is flexible and does not extend as a result of tensile force. However, the connection string 22 is formed so as to bend or loosen as a result of compression.

Figure 3:
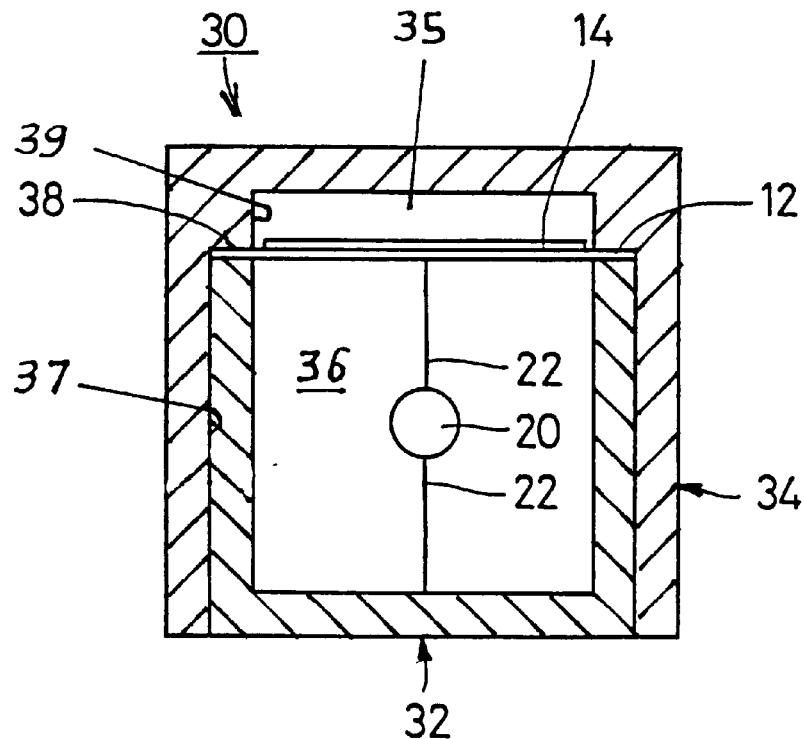
FIG. 3 is a diagram illustrating the impact sensor shown in FIG. 1 housed in a case.

As shown in FIG. 3, the impact sensor 10 is preferably housed in a cylindrical case 30 which includes a cylindrical inner case 32 and a cylindrical outer case 34. The inner case 32 has a upwardly opening hollow portion 36 which houses the mass 20 and string 22. The outer diameter of the inner case 32 is substantially equal to the outer diameter of the board 12. The bottom surface of the board 12 sits on the upper surface of the inner case 32.

The outer case 34 has a downwardly opening hollow portion 35 which has a larger inner diameter portion 37 and a smaller inner diameter 39 portion separated by a step 38. The larger inner diameter portion 37 has an outer diameter which is substantially the same as the inner diameter of the inner case 32. The inner diameter of the smaller inner diameter portion 39, is substantially the same as the inner diameter of the inner case 32. The inner diameter of both the smaller inner diameter portion 39 of the outer case 34 and the inner diameter of the inner case 32 are larger than the diameter of the piezoelectric element 14.

To house the impact sensor 10 inside the case 30, the board 12 is first placed on the top surface of the inner case 32 which is then inserted into the opening in the outer case 34 (up through the bottom as viewed in FIG. 3) until the board 12 is sandwiched between the top of the inner case 32 and the step 38 in the outer case 34. At this point, the board 12 is firmly secured between the two cases 32, 34 and the connection thread 22 is secured between the central portion of the board 14 and the central portion of the bottom of the inner case 32. In this condition, the board 12 is free to vibrate between the spaces 35, 36.

Figure 4:
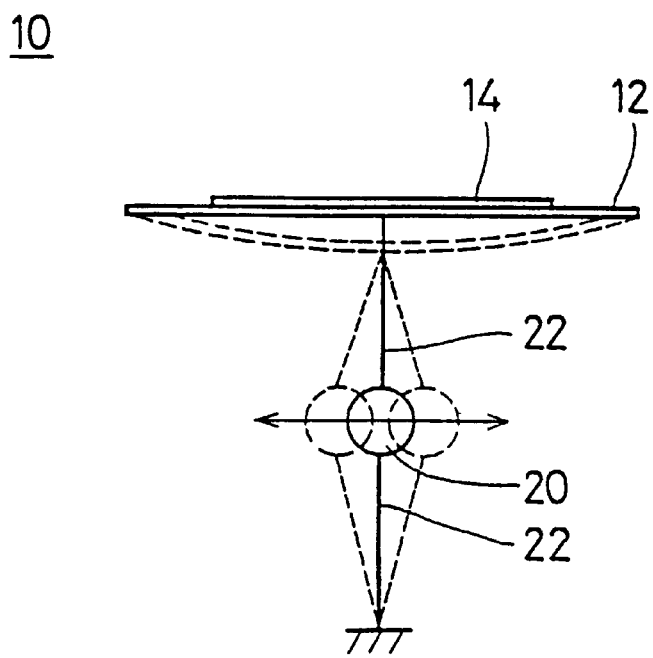
FIG. 4 is a diagram illustrating a state in which an impact parallel to a board has been applied in the impact sensor shown in FIG. 1.
Figure 5:
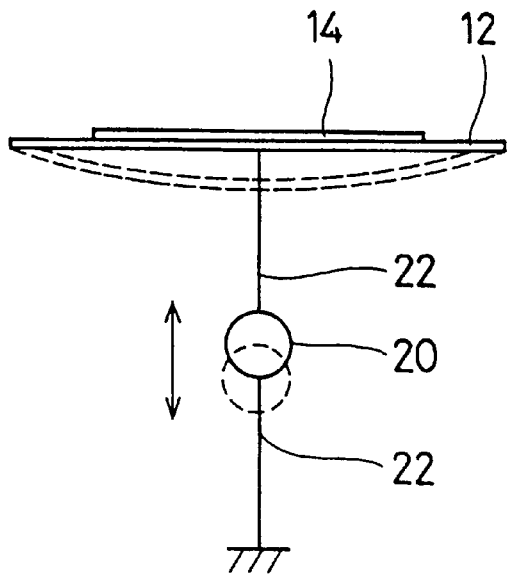
FIG. 5 is a diagram illustrating a state in which an impact intersecting at right angles to the board has been applied in the impact sensor shown in FIG. 1.

When an impact in a direction parallel to the plane of the board 12 is applied to impact sensor 10, as shown in FIG. 4, the mass 20 is displaced in a direction generally parallel to the plane of the board 12. As a result, the central portion of the board 12 is pulled downward, and the board 12 is bent. This causes the piezoelectric element 14 to be deformed, and a charge is generated in response to this deformation. By measuring the output voltage of the piezoelectric element 14, the fact that an impact has been applied to the impact sensor 10 can be detected.

Because the connection string 22 is flexible, a force applied to the mass 20 in a direction perpendicular to the plane of the board 12 will also result in bending of the board 12. Thus, when the mass 22 is subject to an impact, the central portion of the board 12 is pulled, and the board 12 is bent, whereby the piezoelectric element 14 detects the impact.

As described above, regardless of the direction of the impact applied to the impact sensor 10, it is possible to deform the board 12 in substantially the same way. Further, since the connection string 22 has flexibility, the degree to which the mass is free to move is substantially the same in all directions. For this reason, it is possible to cause the board to be deformed to substantially the same degree with respect to impacts of about the same magnitude in any direction. Therefore, it is possible to make the sensitivity of the impact sensor 10 almost constant with respect to impacts in any direction.

As described above, the impact sensor 10 of the present invention is a nondirectional sensor which is capable of detecting impacts in all the directions and which has almost constant sensitivity with respect to impacts in all directions. Therefore, if the impact sensor 10 is mounted in an automobile or the like, it is possible to detect an impact of a car accident, etc.

To operate as a detector for detecting an impact, the piezoelectric element 14 may be excited, and the resonance frequency and impedance thereof may be monitored. When the board 12 is deformed due to the application of an impact, the piezoelectric element 14 is deformed, and the resonance frequency and impedance thereof vary. By measuring the output signal of the piezoelectric element 14 it possible to detect the occurrence of an impact from the change in the resonance frequency and impedance thereof.

Figure 6:
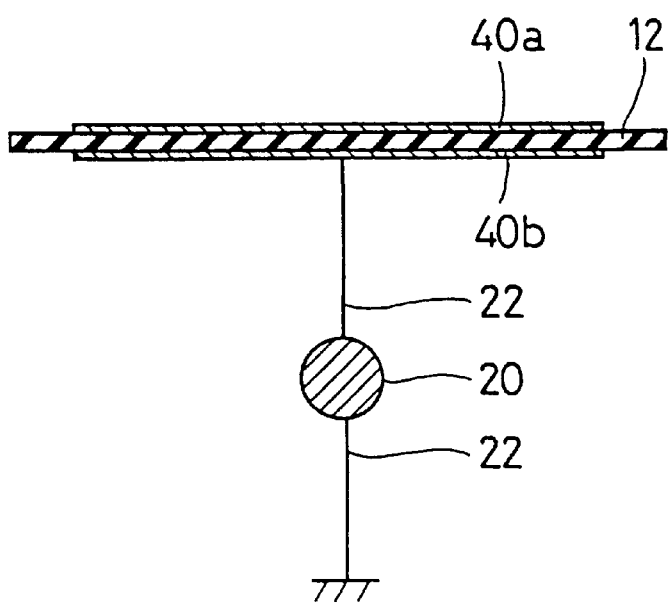
FIG. 6 is a sectional view illustrating another example of an impact sensor constructed in accordance with the principles of the present invention.

In an alternative embodiment shown in FIG. 6, the board 12 itself is formed of a piezoelectric material having electrodes 40a and 40b formed on opposite sides thereof.

Figure 7:
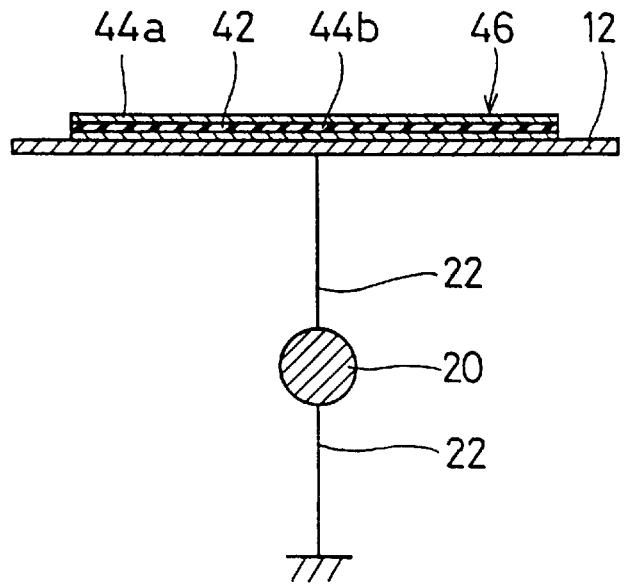
FIG. 7 is a sectional view illustrating yet another example of an impact sensor constructed in accordance with the principles of the present invention.

In yet another embodiment shown in FIG. 7, a detection element 46 comprises a ferroelectric thin film 42 having electrodes 44a and 44b formed on opposite sides thereof. When the board 12 is deformed, the electrostatic capacity of the detection element 46 varies. By measuring the electrostatic capacity of the detection element 46, it is possible to detect the occurrence of an impact.

Alternatively, a resistance thin film or a magnetic thin film may be used as the detection element in the place of the ferroelectric thin film 42. If such a detection element is used, the resistance and the magnetic inductance will vary when the board 12 is deformed. By measuring the variation in the resistance and the magnetic inductance of the detection element, an impact can be detected.

Figure 8:
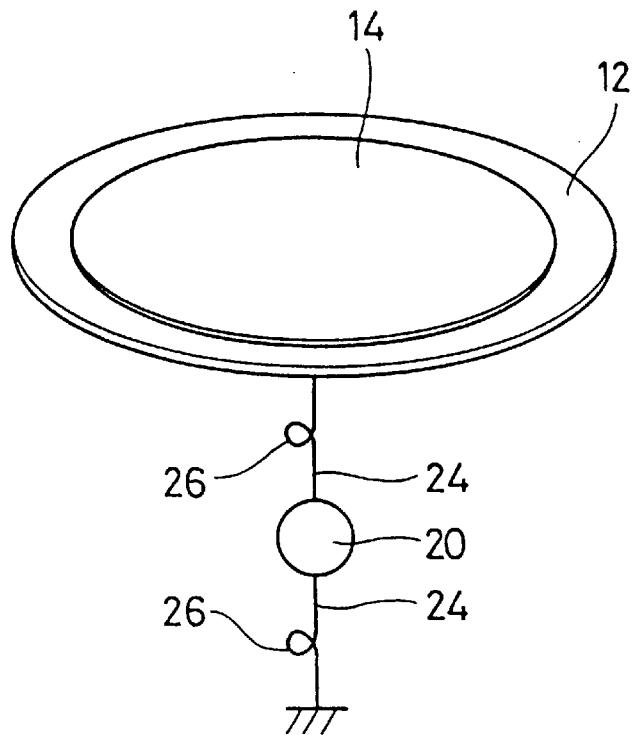
FIG. 8 is a perspective view illustrating another example of an impact sensor constructed in accordance with the principles of the present invention.

As shown in FIG. 8, a connection bar 24 formed of, for example, a rigid metallic material may be used in place of string 22. In this case, it is preferable that a coil-shaped portion 26 or the like is formed in an intermediate portion of the connection bar 24 so that the connection bar 24 is elastic. Alternatively, any flexible linear material can be used. As described above, by making the connection bar 24 elastic, an impact in a direction parallel to the connection bar 24 will cause the displacement of the mass 20. Therefore, it is possible to make the sensitivity of the impact sensor 10 substantially constant with respect to impacts in any direction.

While a string and a bar shaped element have been described, other flexible elements can be used to flexibly connect the mass to the board.

Figure 9:
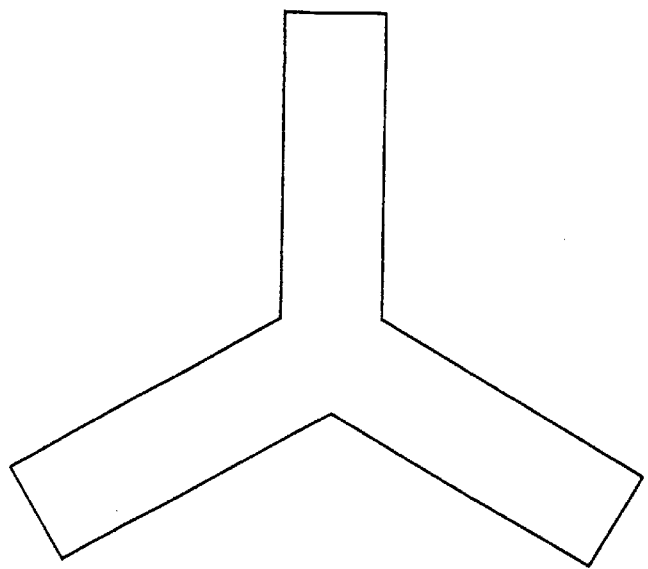
FIG. 9 is a plan view illustrating a modification of the board for use in the impact sensor of the present invention.

While a circular board 12 has been shown, the board 12 may be formed into other shapes such as a regular polygon, for example, a regular triangle or a regular quadrangle. In this case, if the apexes of the regular polygon are supported, the distances from the central portion of the board to the support portions should preferably be made equal. If they are, the deformation of the board 12 with respect to an impact and therefore the sensitivity of the impact sensor 10 can be maximized. To achieve this result, the board 12 should be formed into a rotationally symmetrical shape. For example, as shown in FIG. 9, the board 12 may be of a shape which extends in three directions at an equal angle. However, it is preferred that the board 12 be circular in shape with the distance from the center point to the edge portions are all equal.

Figure 10:
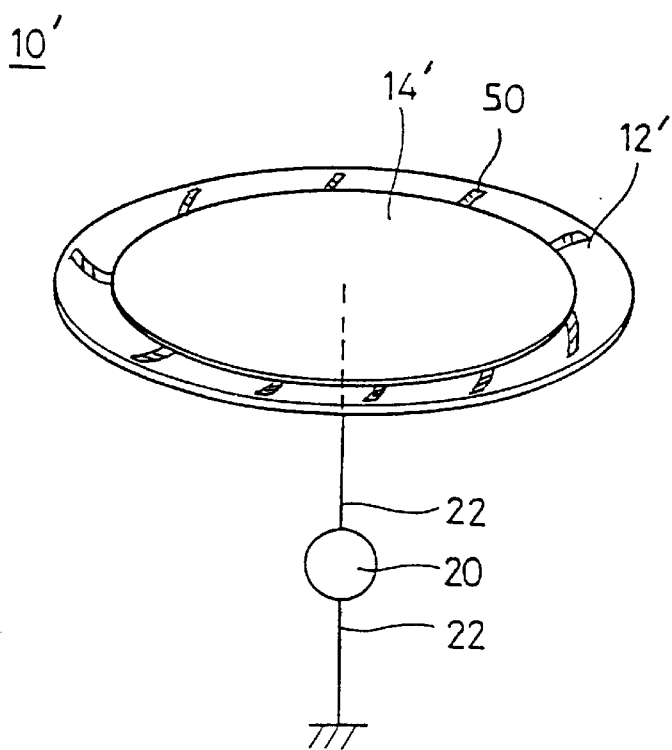
FIG. 10 is a view corresponding to FIG. 1 showing an impact sensor with spiral holes according to an alternate embodiment of the invention.

To increase the deformability of the board, a plurality of holes may be formed on the board. If, for example, spiral holes are formed in a circular shaped board 12' in an impact sensor 10', as shown in FIG. 10, the board 12' is deformed significantly even by a small impact, and a large output signal can be obtained.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An impact sensor comprising:
   a board;
   a mass connected to a central portion of said board by a flexible connector such that said board is deformed when an impact is applied to said mass in substantially any direction; and
   a detector for detecting the deformation of said board.

2. An impact sensor according to claim 1, wherein said connector is a flexible linear material.

3. An impact sensor according to claim 1, wherein said connector is a rigid bar-shaped material having elastic properties.

4. An impact sensor according to claim 1, wherein said detector is a piezoelectric element.

5. An impact sensor according to claim 1, wherein said detector is a detection element using a ferroelectric thin film.

6. An impact sensor according to claim 1, wherein said detector is a detection element using a resistance thin film.

7. An impact sensor according to claim 1, wherein said detector is a detection element using a magnetic thin film.

8. An impact sensor according to claim 1, wherein said board is a piezoelectric member, and wherein electrodes are located on opposite main surfaces of said board such that said board and said electrodes cooperate to define said detector.

9. An impact sensor according to claim 1, wherein said board is rotationally symmetrical in shape.

10. An impact sensor according to claim 9, wherein said board is circular in shape.

11. An impact sensor according to claim 1, wherein said board is planar in shape and an imaginary line passing through the center of gravity of said mass in a direction perpendicular to the plane of said board, passes through the center of said board.

12. An impact sensor according to claim 1, wherein said connector is a flexible string which is connected between a center portion of said board and a support surface, and said mass is coupled to said string at a location between said board and said support surface.

13. An impact sensor according to claim 12, further including a housing for housing said impact sensor, said housing defining said support surface.

14. An impact sensor according to claim 1, further including openings formed in said board for increasing the flexibility of said board.

* * * * *